Aug. 5, 1969     D. M. GRAY     3,459,301
CLEANING, SORTING, AND GRADING APPARATUS
Filed April 1, 1966     3 Sheets-Sheet 1
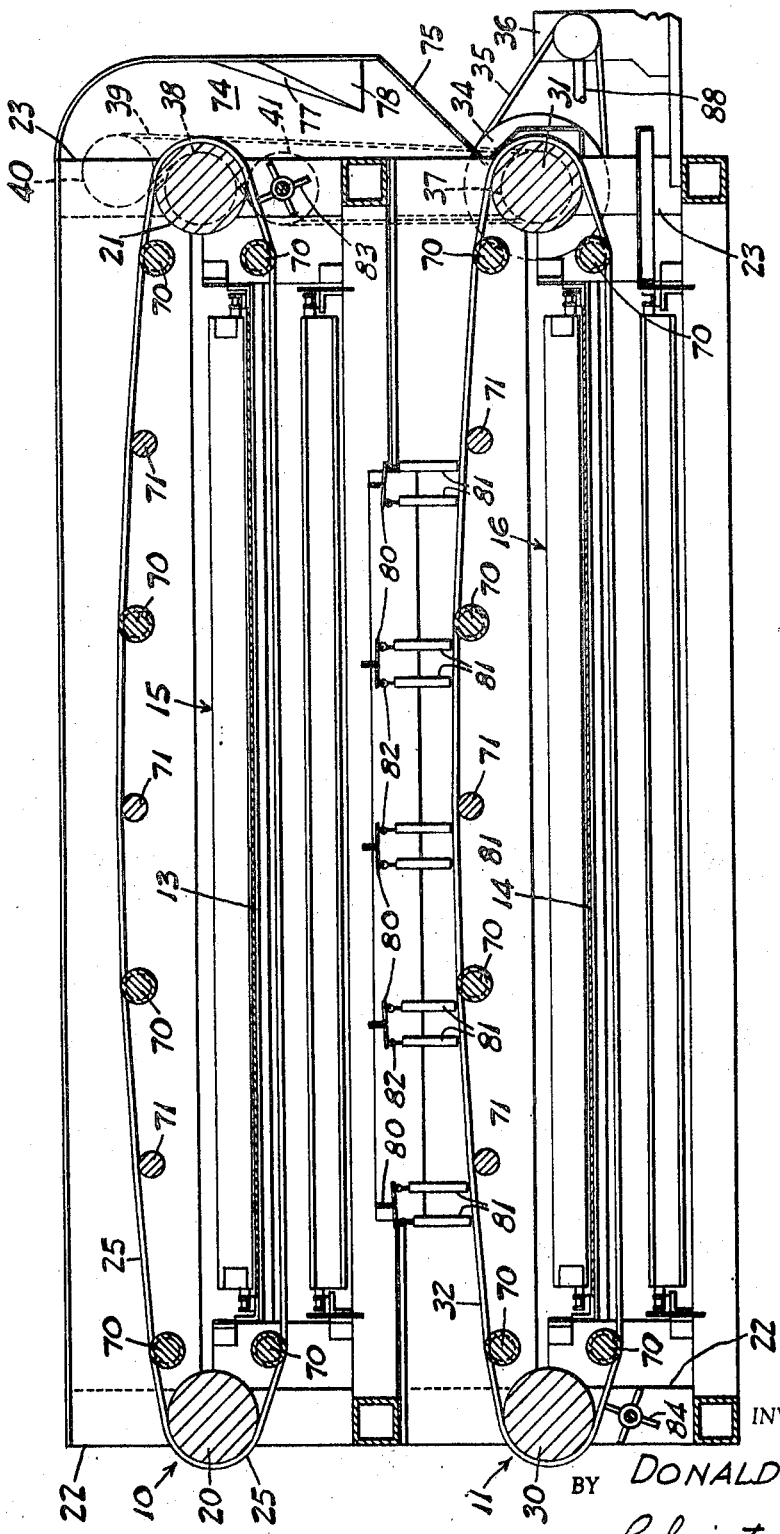
INVENTOR.
DONALD M. GRAY
BY Christel & Bean
ATTORNEYS

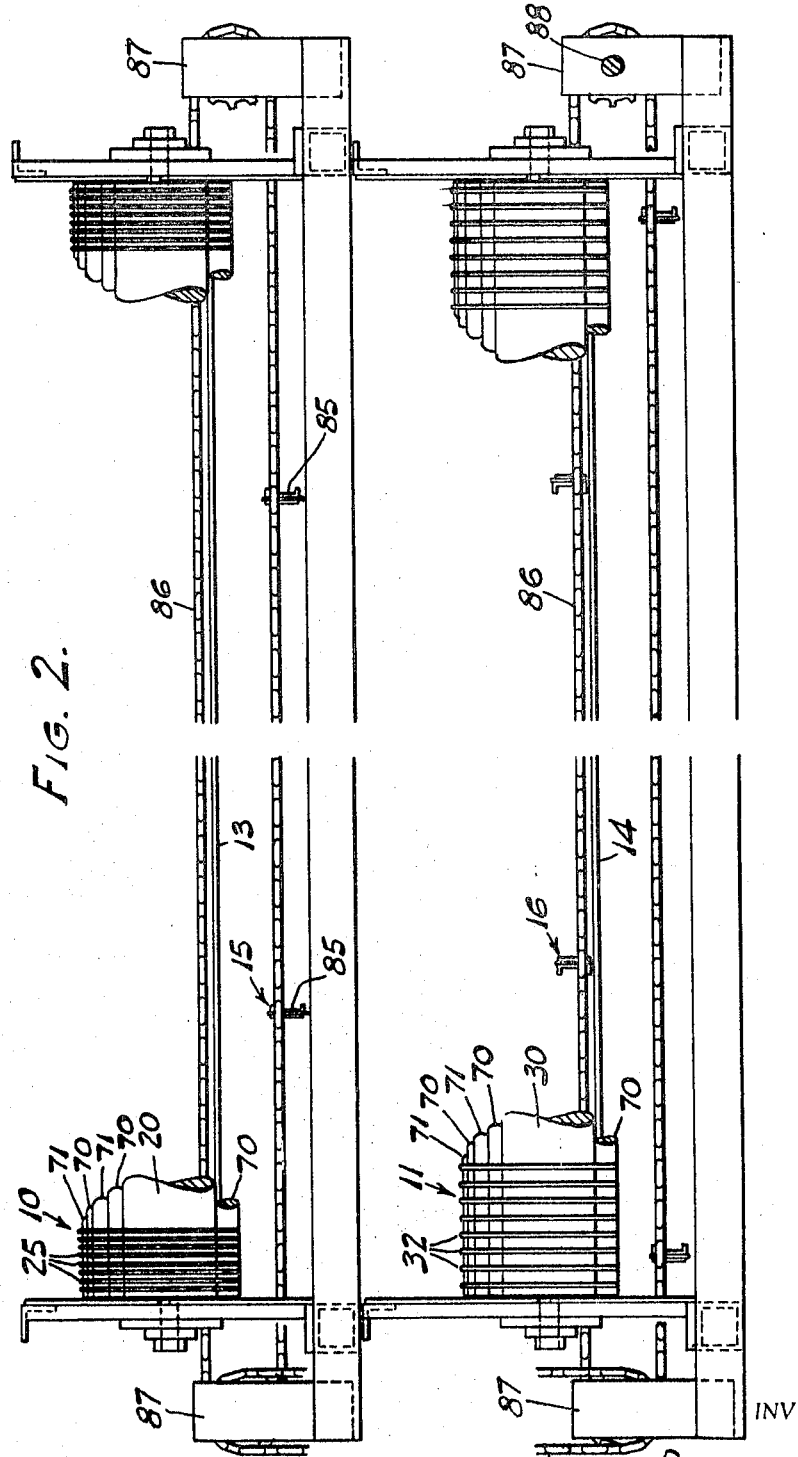

Aug. 5, 1969   D. M. GRAY   3,459,301
CLEANING, SORTING, AND GRADING APPARATUS
Filed April 1, 1966   3 Sheets-Sheet 3
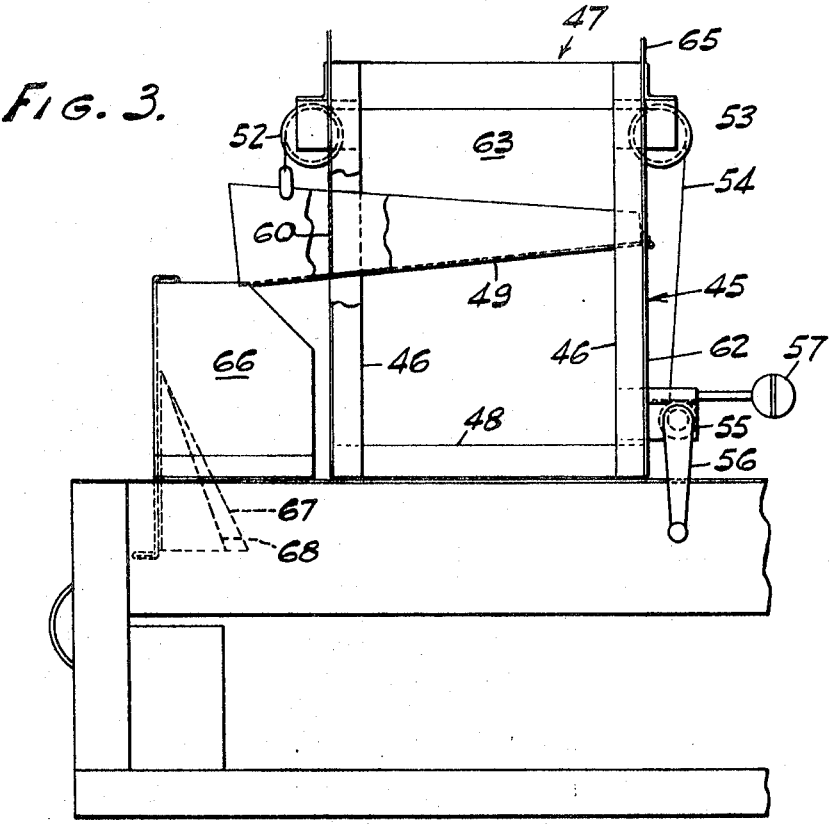
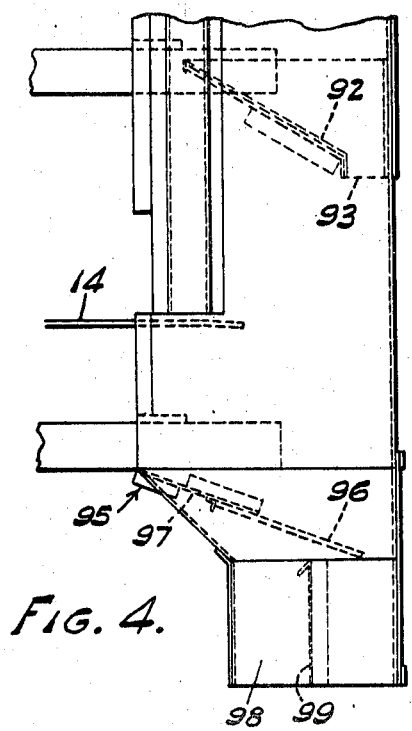
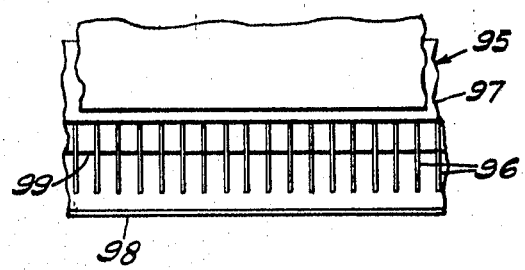
INVENTOR.
DONALD M. GRAY
BY
Christel & Bean
ATTORNEYS United States Patent Office 3,459,301
Patented Aug. 5, 1969

3,459,301
CLEANING, SORTING, AND GRADING
APPARATUS
Donald M. Gray, Batavia, N.Y.; Laura B. Gray, 8 S. Main St.. Batavia, N.Y. 14020, executrix of said Donald M. Gray, deceased
Filed Apr. 1, 1966, Ser. No. 539,450
Int. Cl. B07c 1/16, 5/12
U.S. Cl. 209—102    6 Claims

ABSTRACT OF THE DISCLOSURE

A cleaning and grading structure for peanuts having two superposed sets of grading pulleys, each set consisting of a plurality of laterally spaced narrow endless belt members extending about pulleys, whereby the upper reach of each set of belts forms a horizontally moving grid surface for receiving the peanuts. The sets of belts run in opposite directions and the peanuts fall from the discharge end of the upper set of belts on to the receiving end of the lower set for return movement along the lower set. Agitating means are supported above the lower set and consist of vertically elongated members loosely connected at their upper ends for free swinging movement above but closely adjacent to the material on the belt grid surface. Platforms are disposed between the upper and lower reaches of the belts of each set and wiper members continuously traverse this platform to remove material falling thereon from between the belts of the upper reach.

---

This invention relates to apparatus for separating bulk articles or materials, either for the purpose of grading such articles according to size or for separating undesirable constituents from the desired articles or materials.

The apparatus of the present invention is particularly suited to grading or cleaning agricultural products, although all analogous uses to which the present apparatus lends itself are comprehended as within the scope of the invention. While various products may be sorted, graded and/or cleaned by employment of the apparatus of this invention, by way of illustrating the construction and principles of operation reference will be had herein particularly to cleaning and grading peanuts. Similar cleaning, separating and grading problems are encountered in treating other agricultural products, particularly dry granular products such as peas, beans, shelled corn, wheat and lentils.

As bulk peanuts are received from the farmer they contain various undesired constituents such as twigs and stems, peanut shells, loose shelled peanuts, improperly developed peanuts, dirt, leaves and other foreign matter. The present apparatus is designed and intended for cleaning the bulk peanuts to remove the undesired constituents, debris and foreign matter and for subsequently grading the cleaned peanuts according to size.

Broadly speaking, the apparatus of the present invention comprises a material conveying surface made up of the upper reaches of a plurality of endless belts, cords, or cables which are spaced laterally at a predetermined pitch to pass downwardly therebetween material or articles which will pass between the belt members while retaining larger articles thereon. An important feature of the present invention resides in the provision of novel means for agitating the material passing along on the spaced conveyor belts to impart gentle, yieldable forces against the material tending to align the components thereof so that elongated components are urged to assume a lengthwise position relative to the belt members so that twigs, stems and the like pass downwardly between the belt members during cleaning operations and so that peanuts tend to assume a lengthwise direction in subsequent size grading operations.

Various other objects and advantages resulting from use and application of the principles of the present invention and the novel separating apparatus disclosed herein will appear from a study of the apparatus illustrated in the drawing and described in detail in the following specification. It is to be understood, however, that the apparatus disclosed herein is by way of example only and that numerous mechanical modifications may be effected therein without departing from the invention, the spirit and scope of which is limited only as defined in the appended claims.

In the drawings:

FIG. 1 is a general side elevational view of one form of the cleaning and grading machine of the present invention with portions thereof broken away and other portions shown in cross section for added illustration;

FIG. 2 is an end elevational view of the structure of FIG. 1 viewed from the left end thereof;

FIG. 3 is a fragmentary side elevational view of the left-hand portion of the structure of FIG. 1 showing a feed hopper arrangement therefor;

FIG. 4 is a fragmentary end view of a portion of the structure of FIGS. 1 and 2 showing a debris delivery means therefor; and FIG. 5 is a top plan view of a portion of the structure of FIG. 4.

Like characters of reference denote like parts throughout the several figures of the drawings and, referring first to the general arrangement and mode of operation of the machine, the peanuts are fed downwardly upon one end of a horizontally moving conveyor means which is generally in the form of an endless belt designated generally by the numeral 10 in FIG. 1. After traversing the length of this conveyor means the peanuts fall to a second reversely moving conveyor which lies beneath the first conveyor and is designated generally by the numeral 11 in FIG. 1, so that the peanuts are carried horizontally back to the starting end of the machine, whence they are discharged. Conveyor 11 is also in the general form of an endless belt.

Still referring to the apparatus of the present invention in general terms, plate members 13 and 14 extend horizontally beneath the upper portion of the conveyor belt means 10 and 11 to receive debris which falls therethrough, and wiper mechanisms designated generally by the numerals 15 and 16 continuously traverse the plate members 13 and 14 in a direction at right angles to the direction of travel of the conveyor means to remove debris from the plate members and discharge the same from the machine.

Referring now more particularly to the conveyor means heretofore designated generally by the numeral 10 and 11 and with particular reference to FIG. 1, the upper conveyor means 10 comprises a pair of rolls 20 and 21 which are journaled in uprights 22 and 23 which form a part of the general framework of the machine. A lateral series of endless flexible cord-like members pass around the rolls 20 and 21 to be driven thereby. In the present instance these members comprise coil springs 25 which are laterally spaced at predetermined distances whereby unwanted debris may pass between adjacent springs while the peanuts are carried along on the upper surfaces of the springs.

The lower conveyor means 11 comprises similar end rolls 30 and 31 and a similar series of endless coil spring members 32 passing about the rolls 30 and 31. It is desired that the spring members 25 and 32 travel in opposite longitudinal directions and accordingly the following driving connections for the end rolls 21 and 31 are provided.

A pulley 34 fixed to the mounting shaft of roll 31 is driven by a belt connection 35 from a speed reducer and motor unit 36. A pulley 37 likewise mounted on the shaft of roll 31 and a pulley 38 mounted on the shaft of roll 21 are connected by a belt 39 which also passes about idler pulleys 40 and 41 as shown in FIG. 1, whereby the upper pulley 38 rotates in a clockwise direction and the lower pulley rotates in a counterclockwise direction.

Reference will now be had particularly to FIG. 3 which shows the means for delivering to the upper conveyor means 10 the starting material which in the illustrative instance described herein comprises peanuts as delivered from the farmer or as harvested by him, the peanuts then having mixed therewith twigs, stems, undeveloped peanuts, broken shells and other debris.

A generally rectangular frame designated generally 45 surmounts the principal framework of the machine as shown in FIG. 3, comprising uprights 46 and top and bottom rail members 47 and 48. A chute 49 is disposed between the uprights and pivoted to frame 45 at 50. In FIG. 3 the chute is shown in closed or non-feeding position and means for lowering the chute comprise pulleys 52 and 53, a cable 54, and a hand winch 55 including air operating handles 56 and a releasable latch means 57.

In the position illustrated in FIG. 3 a vertical plate 60 extending between uprights 46 extends downwardly into the chute to close the same. As chute 49 is adjustably lowered it moves downwardly away from the lower edge of plate 60 to open a passage to the left along the chute, as viewed in FIG. 3. Such lowering also promotes feeding of material to the left along the chute by reason of the increased inclination thereof.

The frame 45 is closed at the pivoted end of chute 49 by a vertical plate 62 and side plates 63 attached to frame 45 above chute 49 extend down into the chute. Side plates 63 extend down to the bottom wall of chute 49 when the latter is in the uppermost position illustrated in FIG. 3.

Articles or material to be treated, in the illustrative instance peanuts, are dropped into the foregoing feed device from above. A chute or duct indicated schematically and fragmentarily at 65 in FIG. 3 may be employed. When chute 49 is lowered the material will fall from the left hand end of the chute 49, at a rate corresponding to the degree of lowering of the chute, to a box-like receiver 66 through which the peanuts fall to the left hand end of the conveyor means 10.

A series of vanes or flanges 67 and 68 project inwardly from the left hand wall of box-like receiver 66 as shown in FIG. 3. In the present instance the flanges 67 and 68 are spaced approximately three inches apart in a direction at right angles to FIG. 3 and every other flange 67 projects inwardly beyond intermediate flanges 68 as clearly appears from FIG. 3. As material falls from the end of chute 49 it falls against the flanges 67, 68 which tend to deflect twigs and the like so that they do not lie across the spring members 25 as they move along conveyor means 10, thus tending to align elongated foreign matter of this nature in a longitudinal direction to promote falling thereof through the spaces between the spring members or belts.

In the present instance the end rolls 20, 21, 30 and 31 are plain and ungrooved and a series of idler rolls are provided for supporting and guiding the endless spring members and for holding them in the proper lateral spacing. FIG. 1 shows a plurality of peripherally grooved rolls 70 and a plurality of plain rolls 71. The rolls 70 and 71 are idlers and as shown in FIG. 1, are arranged alternately beneath the upper reach of each of the spring members 25 and 32 in such manner as to support the same in slightly arched or upwardly convex form. This arched arrangement is important since it assures that all of the rolls 70 and 71 are continuously rotated by the belts or spring members 25 and 32. As material hanging between belts 25 or 32 approaches a roll 70 or 71 the rotation of the roll lifts such material to dislodge the same and throws it upwardly to free it from the belts.

Further grooved rolls 70 are provided to engage the under portions of the endless spring members 25 and 32 at each end thereof to guide such under portions beneath the debris-receiving plates 13 and 14. Note that grooved rolls 70 are provided both above and below and closely adjacent to rolls 20, 21, 30 and 31 to space the belts accurately in a transverse direction. If desired the grooves in the grooved rolls 70 may be somewhat deeper than the diameters of the endless spring members so that material passing along with the spring members is engaged and raised by the adjacent portions of the grooved rolls to agitate or reorient portions of such material.

Material passing along the upper surface of the spring members 25 to the right hand end thereof as viewed in FIG. 1, falls into an end casing 74 and is deflected by a lower wall portion 75 thereof onto the right hand end of the spring members 32 of the lower conveyor means to pass therealong to the right as viewed in FIG. 1. Vertical flanges or vanes 77 and 78 mounted against the interior wall of casing 74 are the same and for the same purpose as the vanes 67 and 68 described earlier herein.

The size and spacing of the endless coil spring members of the conveyor means 10 and 11 may assume various dimensions for various cleaning and sorting purposes but in order to set forth a full working embodiment of one form of the present invention it may be stated that in the present illustrative instance, wherein ordinary peanuts are being cleaned, the coil springs from which the endless members 25 and 32 are made are about $3/16$-inch in outside diameter, the spring members 25 of the upper conveyor means 10 are spaced at a pitch of $5/16$-inch, and the spring members 32 of the lower conveyor means 11 are spaced at a pitch of $5/8$-inch.

An important feature of the machine of the present invention is the provision of pendant means supported above one or both of the conveyor means, in this instance, the lower means 11, which means are so positioned that their lower ends engage objects or material on the spring members 32 and lightly agitate the same to reorient such objects and material to promote the falling between the supporting spring members of unwanted matter which is small enough to fall between the spring members or at least narrow enough in one dimension, as in the case of twigs and stems.

As shown in FIG. 1, a series of inverted T-bars 80 extend transversely over the lower conveyor means 11 and each has suspended therefrom a double row of weights 81, the weights being suspended by eye connections 82 whereby they swing freely as they engage material lying on the upper portions of the spring members 32.

In some cleaning or grading operations free swinging movement of the weights in all directions may not be required and may even be undesirable. In such cases ordinary pivotal connections may be employed instead of eye connections 82, whereby the weights will swing freely in a longitudinal direction. The weights 81 may be variously spaced and positioned along the T-bars 80 but, again by way of example only, in the illustrative instance being described herein the weights of each single row are one inch apart and the weights of the two rows of each T-bar are staggered so that, viewed at right angles to FIG. 1, they present a spacing of one-half inch along each T-bar.

The free suspension of the weights 81 produces an action against material on the conveyor means which tends to reorient material and which, in particular, tends to cause elongated pieces to be shifted into longitudinal alignment with the spring members for more ready discharge downwardly between the spring members. At the same time, the ready lateral yieldability of the weights due to their free suspension, avoids any tendency to cause the material to mass or gather ahead of the weight members under various conditions.

In FIG. 1, the numerals 83 and 84 designate paddle wheels which wipe against belts 25 and 32, respectively, to dislodge material or articles which may tend to become stuck between adjacent belts. The wheel 83 may be driven by pulley 41 and wheel 84 may be belt driven from pulley 30 or otherwise. Material dislodged by wheel 83 falls to the belts 32 and material dislodged by wheel 84 may be collected in a chute or bag or in any other way.

From the left-hand end of the lower conveyor means the peanuts retained on the spring members 32 fall to any desired receiving means such as containers or further processing or sorting and grading apparatus.

Brief reference was had earlier herein to the wiping mechanisms generally designated by the reference numerals 15 and 16 which continuously remove from the plate members 13 and 14 waste material which falls through the supporting spring members 25 and 32. Referring now more particularly to FIG. 2, a plurality of wiper blades 85 extend longitudinally of the machine and are attached at their opposite ends to endless chains 86 which engage sprockets rotatably mounted in housings 87. The upper reaches of the two chains 86 pass above the plate members 13 and 14 and move from right to left as viewed in FIG. 2 to cause the wiper blades 85 to wipe debris off of plate members 13 and 14.

In FIG. 1 a longitudinal drive shaft 88 is shown extending from the speed reducer 36 and shaft 88 comprises the drive shaft of the lower right hand housing 87 of FIG. 2, as there shown. The upper and lower chains 86 are connected for joint operation by a chain and sprocket connection 90 which extends between the two left-hand housings 87 of FIG. 2.

The means for disposing of the material thus removed from the plate members 13 and 14 is shown in FIG. 4 which is a fragmentary view taken from the opposite end of the structure from FIG. 2. The material from upper plate member 13 falls to an inclined plate 92 which comprises part of a converging chute 93. A waste bag may be attached to the lower end of chute 93 or material therefrom may be conducted from the machine in any desired manner.

Material from the lower plate member 14 falls to an inclined structure 95 comprising a series of spaced rod members 96 extending from a plate 97. The rods 96 overlie a receiving chute 98 which has a medial longitudinal wall 99 as shown in FIGS. 4 and 5. The spacing of rods 96 is such that whole peanuts will fall therebetween into chute 98 while stems and the like which are too large or for some other reason have not passed out between belt members 32 slide down off the ends of rods 96 to the space at the right of wall 99 as viewed in FIG. 4.

Speaking generally, dirt stems and rootlets and other small sized foreign matter falls through the relatively narrow openings between the belts of upper conveyor 10 while nubbins, twigs, shells and nuts from broken peanuts, and other undesired materials fall through the larger openings between the belts of conveyor 11. This is with respect to peanut cleaning. The same apparatus, with appropriately spaced belts, may be used for size grading of peanuts after cleaning. Any number of conveyors, such as 10 and 11, may be employed successively so that cleaning and size grading may be carried out in the same apparatus, the material moving from one conveyor to the next continuously. As indicated heretofore, a wide variety of analogous cleaning and size grading operations may be performed with the present apparatus, both in the agricultural field and others.

I claim:

1. Apparatus for sorting bulk material comprising two superposed sorting mechanisms each comprising a pair of horizontally spaced pulleys having horizontally rotational axes and each having a plurality of laterally spaced endless belt members extending about said pulleys whereby the upper reach of each forms a horizontally moving grid surface for receiving material to be sorted, means extending between the upper and lower reaches of each of the belt members of the two superposed sorting mechanisms for receiving material falling between the respective belt members of the two mechanisms and removing the same laterally from the apparatus, means driving the belt members of the two mechanisms in opposite directions, and means for directing material retained on the upper belt members and falling from the discharge end thereof to the upper surface of the belts of the lower mechanism for return flow in the opposite direction.

2. Apparatus according to claim 1 wherein the space between adjacent belts of the upper mechanism is less than the space between belts of the lower mechanism whereby material below a certain width passes downwardly between the belts of the upper mechanism, wider material passes downwardly between the belts of the lower mechanism, and still wider material is retained on the belts of the lower mechanism.

3. Apparatus according to claim 2 wherein the upper mechanism eliminates debris smaller than the smallest useful material by downward passage between the belts thereof and the lower mechanism sorts the useful material as between smaller and larger sizes by downward passage of the smaller sizes between the belts thereof.

4. Apparatus for sorting bulk material comprising a pair of horizontally spaced pulley means having horizontal rotational axes, a plurality of laterally spaced endless belt members extending about said pulley means whereby the upper reaches thereof form a horizontally moving grid surface for receiving material to be sorted, means extending between the upper and lower reaches of said belt members for receiving material which passes downwardly between the upper reaches of said spaced belt members, and means for agitating the material on said moving grid surface to substantially continuously reorient the material whereby articles having a width dimension less than the spacing between said spaced belt members fall through to said receiving means, said agitating means comprising a plurality of laterally spaced weight members and means suspending the same, said weight members comprising solid vertically elongated members loosely connected at their upper ends by said suspension means for free swinging movement above but closely adjacent to said grid surface, said material receiving means extending between the upper and lower reaches of said belt members comprising a horizontal stationary receiving surface and including wiper means movable across said surface at right angles to the direction of movement of said belt members to remove material therefrom.

5. Apparatus for sorting bulk material comprising two superposed sorting mechanisms each comprising a pair of horizontally spaced pulleys having horizontal rotational axes and each having a plurality of laterally spaced endless belt members extending about said pulleys whereby the upper reach of each forms a horizontally moving grid surface for receiving material to be sorted, means driving the belt members of the two mechanisms in opposite directions whereby material falling from the discharge end of the upper mechanism falls to the upper surface of the belts of the lower mechanism for return flow in the opposite direction, and a baffle wall disposed at the discharge end of the upper mechanism and extending downwardly therefrom, said baffle wall having a series of vertical flanges projecting into the path of movement of material falling from the upper mechanism, alternate flanges of said series projecting toward said path a greater distance than the intermediate flanges of said series for directing oblong objects toward a longitudinal path of movement.

6. Apparatus for sorting bulk material comprising a pair of horizontally spaced pulley means having horizontal rotational axes, a plurality of laterally spaced endless belt members extending about said pulley means whereby the upper reaches thereof form a horizontally moving grid surface for receiving material to be sorted, means extending between the upper and lower reaches of said belt members for receiving material which passes downwardly between the upper reaches of said spaced belt members, and means for agitating the material on said moving grid surface to substantially continuously reorient the material whereby articles having a width dimension less than the spacing between said spaced belt members fall through to said receiving means, said agitating means comprising a plurality of laterally spaced weight members and means suspending the same, said weight members comprising solid vertically elongated members loosely connected at their upper ends by said suspension means for free swinging movement above but closely adjacent to said grid surface, and a preliminary sorting structure above said belt and pulley means and likewise comprising horizontally spaced pulleys, a plurality of spaced endless belt members extending about said pulleys, and means extending between the upper and lower reaches of the belt members for receiving material falling between the belt members, the discharge end of said belt members being above the receiving end of the first mentioned belt members, and means driving said first and second belt members in opposite directions whereby material passes successively along the upper reaches of the two sets of belt members in opposite directions, said material receiving means extending between the upper and lower reaches of said belt members comprising a horizontal stationary receiving surface and including wiper means movable across said surface at right angles to the direction of movement of said belt members to remove material laterally from said surface, and a vertical series of flanges interposed in the path of material falling from the upper belt members to the lower belt members, alternate flanges of said series projecting into said path a greater distance than the intermediate flanges of said series to deflect oblong members into a generally longitudinal path of movement.

References Cited

UNITED STATES PATENTS

| | | | |
|---|---|---|---|
| 1,299,324 | 4/1919 | Goodykoontz | 198—230 X |
| 1,841,333 | 1/1932 | Kyle | 209—102 |
| 2,361,034 | 10/1944 | Kenitz | 209—114 |
| 2,776,740 | 1/1957 | Claessen | 198—229 X |

FOREIGN PATENTS

| | | |
|---|---|---|
| 110,596 | 5/1940 | Australia. |
| 725,783 | 9/1942 | Germany. |
| 443,267 | 12/1948 | Italy. |

M. HENSON WOOD, JR., Primary Examiner

RICHARD A. SCHACHER, Assistant Examiner